Patented Dec. 19, 1939

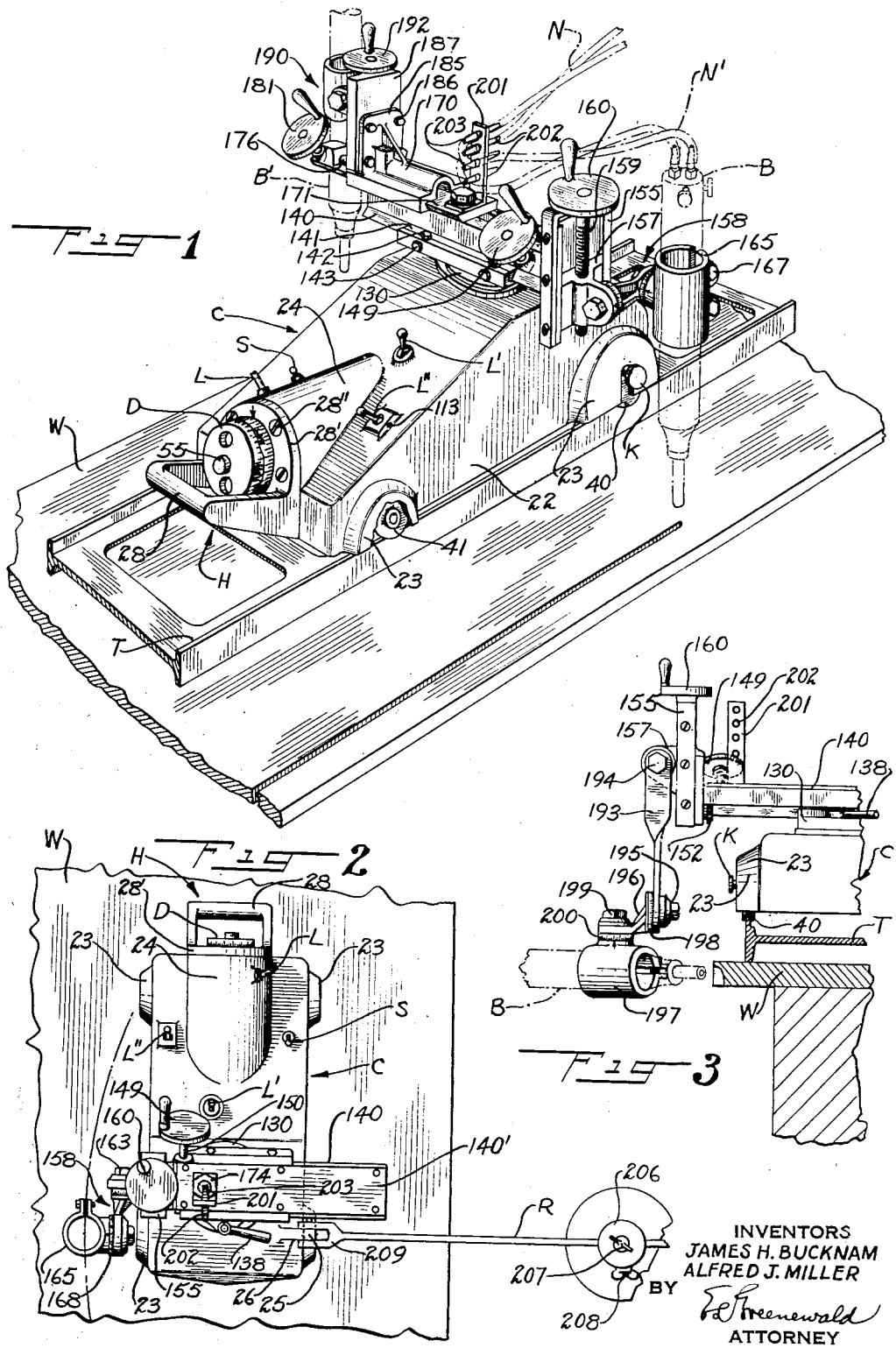

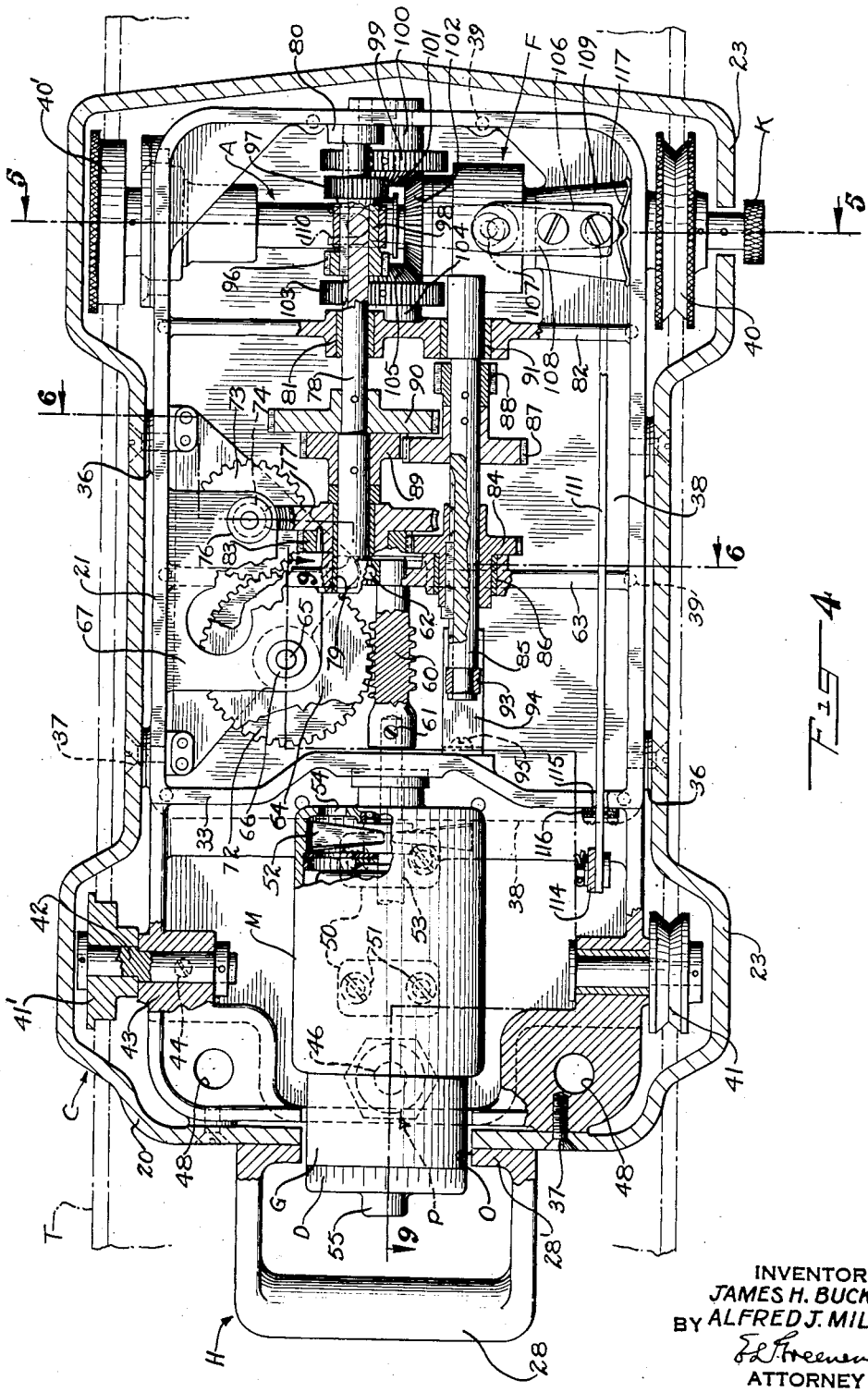

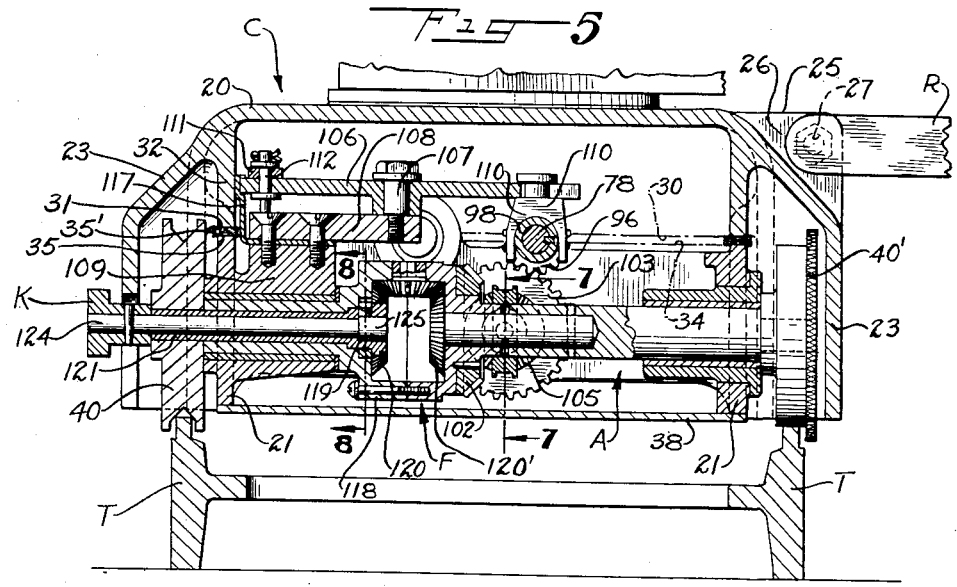
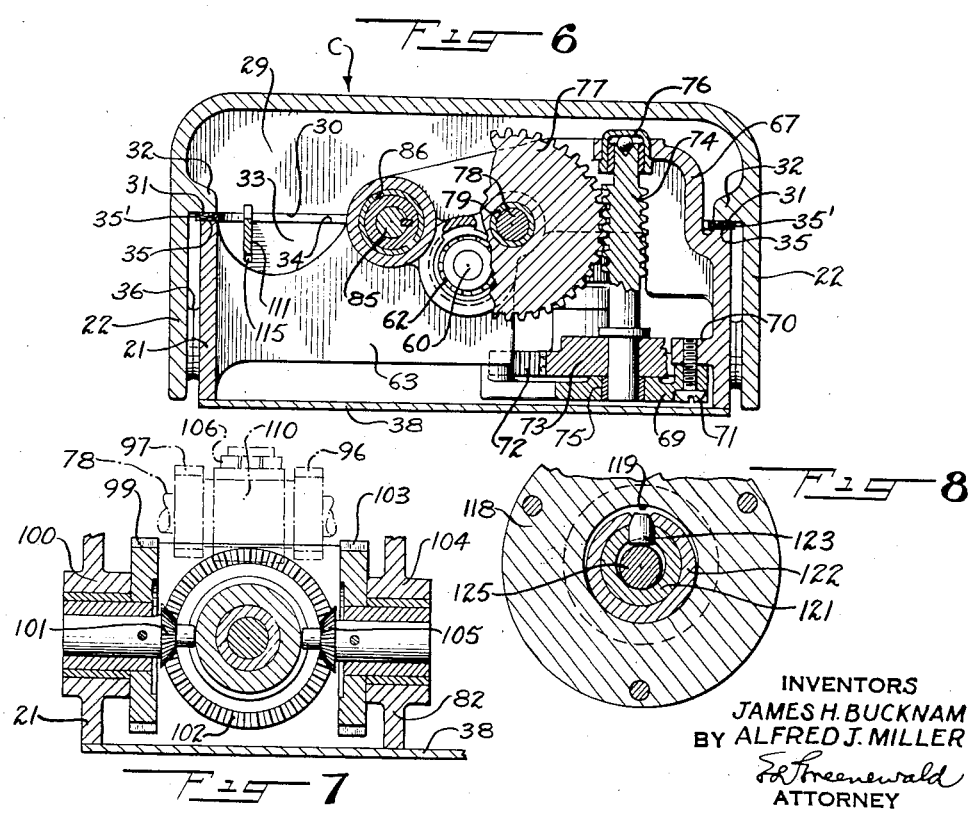

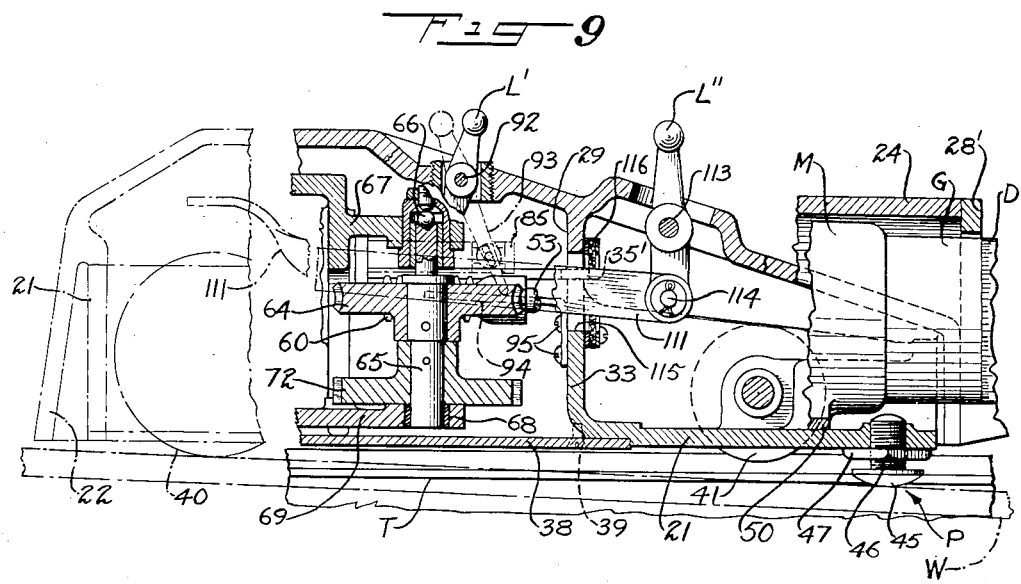
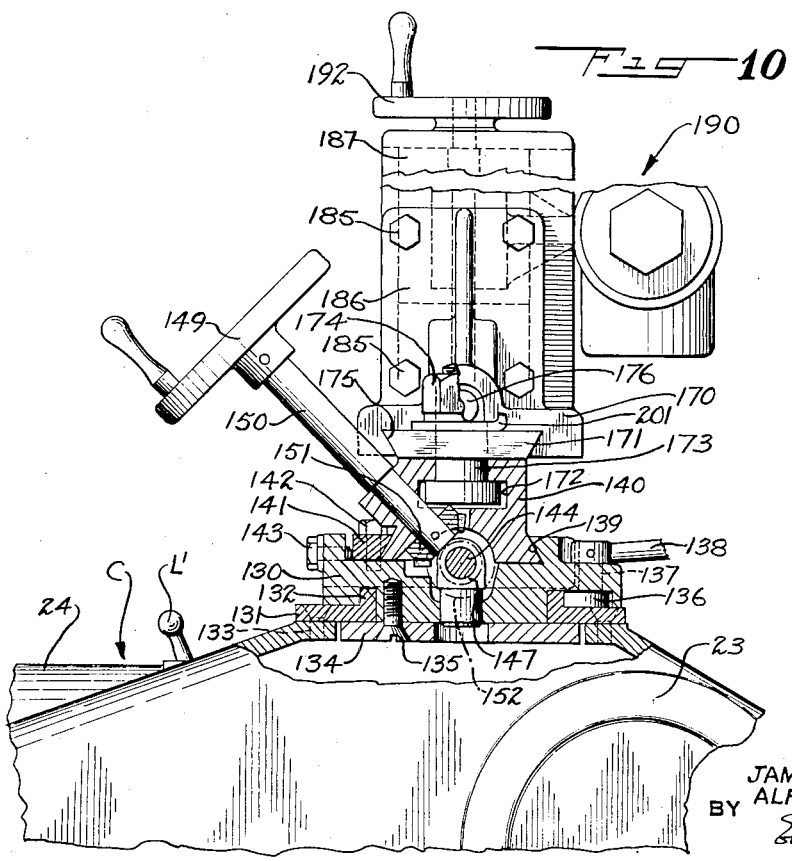

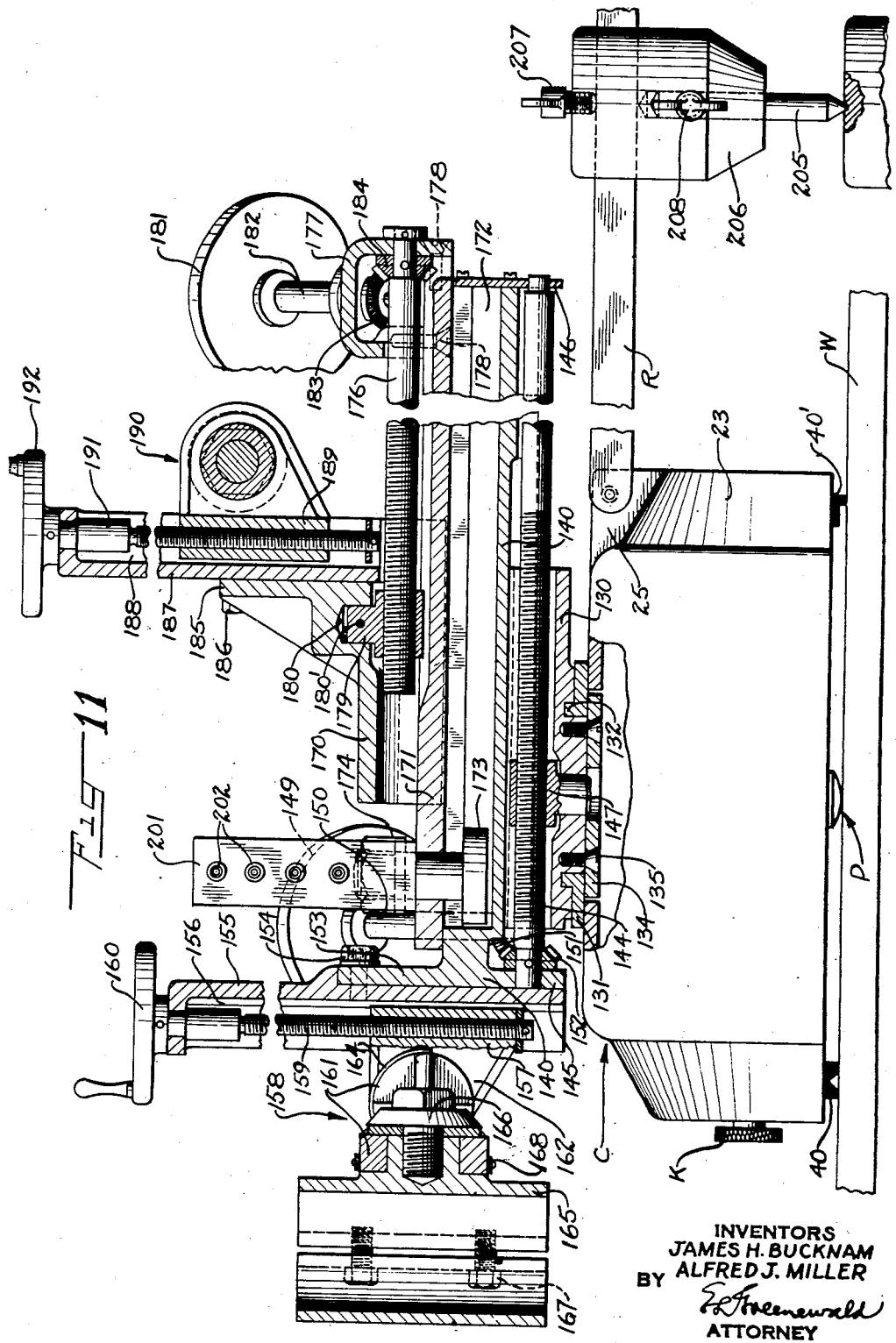

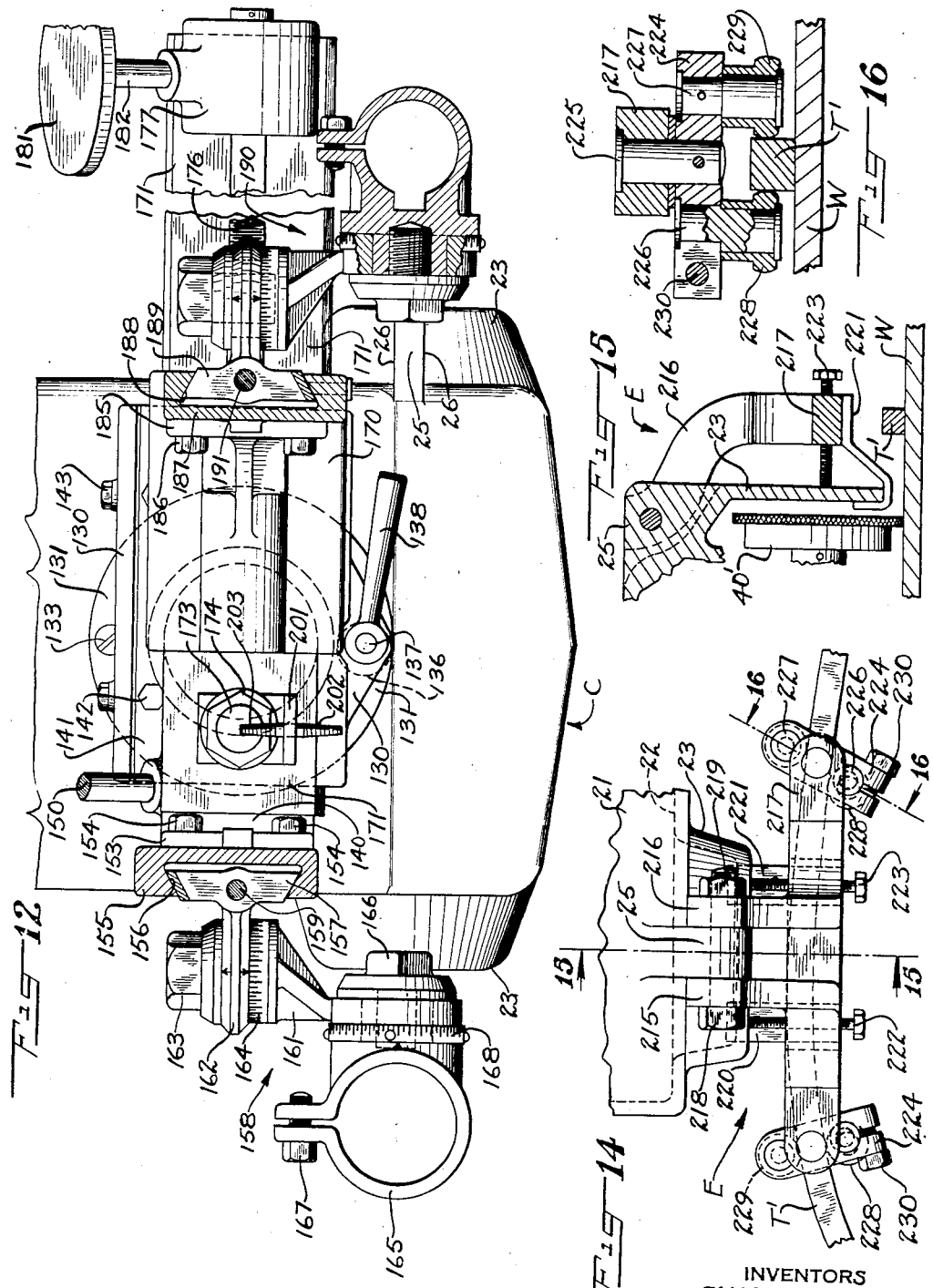

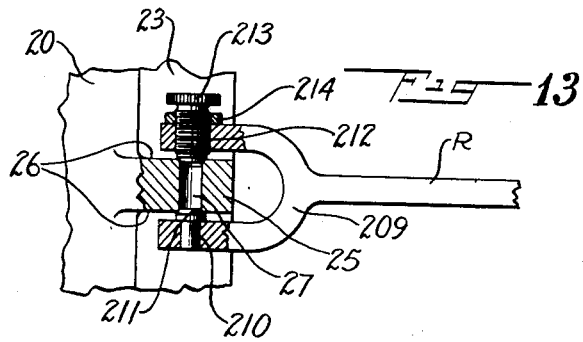
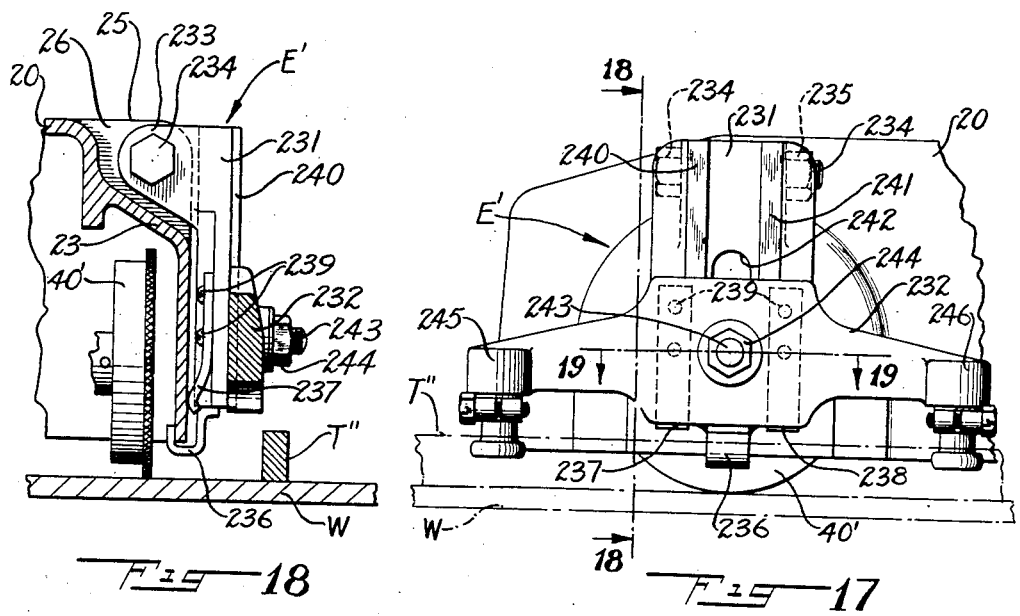
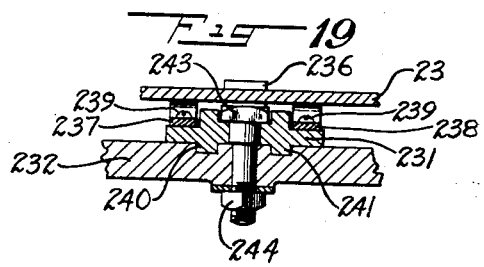

2,183,605

UNITED STATES PATENT OFFICE 2,183,605

CUTTING AND WELDING MACHINE

James H. Bucknam and Alfred J. Miller, Cranford, N. J., assignors, by mesne assignments, to Union Carbide and Carbon Corporation, a corporation of New York Application January 12, 1935, Serial No. 1,470

36 Claims. (Cl. 266—23)

This invention relates to cutting, welding, and flame-machining machines, having special reference to small portable machines comprising a self-propelled wheeled carriage supporting one or more torches or blowpipes for cutting, welding, and machining by means of an oxy-fuel flame. However, certain features of the invention are applicable to other types of cutting, welding, and machining equipment and processes.

Generally, the object of this invention is to provide a machine of the character indicated which shall be efficient and flexible in operation in both the travel of the carriage and the adjustment of the blowpipes thereon, and simple and convenient to manipulate, so that the machine shall have a wide range of usefulness.

More specifically, the objects of this invention are to provide a machine of the character indicated in which all the motor and driving mechanism shall be well protected and the gearing shall be completely enclosed in a dust-proof casing to minimize lubrication and maintenance costs; in which the weight shall be light and yet so distributed that the center of gravity is sufficiently low to prevent over-balancing by any adjustments of the blowpipes; which shall be capable of rectilinear travel on a track and universal travel on the surface of the work, either hand or automatically guided, over a wide range of speeds; which shall have a two-wheel drive for both rectilinear and curvilinear travel; which shall support at least one torch or blowpipe or similar tool capable of at least two independent universal adjustments through swivels and conveniently located handwheels, or at least two blowpipes capable of independent universal adjustment which may be positioned apart or together at either side or in front of the machine, or at least two blowpipes mounted on a single turntable and cross arm and still capable of independent universal adjustment; and which shall support at least one blowpipe or similar tool in such a manner that it may be directed against the edge of or underneath the work on which the machine is operating.

These and other objects, together with the novel features of this invention which achieve these objects, will appear in the following description having reference to the accompanying drawings, in which:

Fig. 1 is a perspective view of a machine embodying the principles of this invention, showing the machine traveling on a track making a rectilinear cut;

Fig. 2 is a plan view of the machine, showing the machine traveling on the surface of the work making a circular cut guided by a radius rod;

Fig. 3 is a partial front end view of the machine, showing the machine traveling on a track and preparing an edge for welding by a special adjustment;

Fig. 4 is a plan view of the inside of the machine, showing part of the wheel support, part of the motor, part of the driving mechanism, and the cover of the casing or carriage in section;

Fig. 5 is a section on the line 5—5 of Fig. 4, showing the differential and part of the neutral, forward, and reverse mechanism;

Fig. 6 is a section on the line 6—6 of Fig. 4, showing part of the drive mechanism;

Fig. 7 is a section on the line 7—7 of Fig. 5, showing the axle driving gear and pinions;

Fig. 8 is a section on the line 8—8 of Fig. 5, showing the differential locking device;

Fig. 9 is a section on the line 9—9 of Fig. 4, showing part of the driving mechanism, the gear shift and the neutral, forward, and reverse levers, and the rear ball skid construction;

Fig. 10 is a longitudinal section through the vertical axis of the turntable, showing the cross arm and adjusting mechanism in transverse section;

Fig. 11 is a transverse section through the vertical axis of the turntable, showing the cross arm and adjusting mechanism in longitudinal section;

Fig. 12 is a plan view of the turntable, cross arm, and torch-supporting mechanism, showing certain portions in section;

Fig. 13 is a plan view, partly in section, showing the detail of the radius rod construction and attachment;

Fig. 14 is a plan view of the guide bracket for directing the machine along a predetermined rectilinear or curvilinear path by means of a single track or template when the machine travels on the surface of the work;

Fig. 15 is a section on the line 15—15 of Fig. 14, showing the method of attaching the guide bracket to the casing or carriage of the machine;

Fig. 16 is a section on the line 16—16 of Fig. 14, showing the adjustable roller follower construction of the guide bracket;

Fig. 17 is a side elevation of a modified form of guide bracket, having means for vertically adjusting the bracket;

Fig. 18 is a section on the line 18—18 of Fig. 17, showing the method of attaching the guide bracket to the carriage or casing of the machine; and Fig. 19 is a section on the line 19—19 of Fig. 17, showing the means for vertically adjusting the guide bracket.

As shown, a machine embodying the principles of this invention comprises a box-like, wheel-supported carriage or casing C capable of traveling on a track T (Fig. 1) or on the surface of the work W (Fig. 2) and having arranged therein a motor M, controlled by a governor G, and an axle A and gear mechanism for transmitting power from the motor M to at least one of the wheels comprising the wheel support. The governor G may preferably be of the conventional centrifugal make-and-break type, adjustable by a graduated dial D projecting through an opening O in the rear end of the casing C. The motor may be supplied with current through a power line L and may be started and stopped by a line switch S projecting through the casing C. The gear mechanism includes speed change gears which may conveniently be shifted by a lever L' projecting through the casing C, a combination neutral, forward, and reverse mechanism, conveniently operated by a lever L" projecting through the casing C, and a differential F, permitting curvilinear drive through both wheels, which may be locked for rectilinear drive by means of a knob K, all of which will be hereinafter more fully described. The carriage may have a conveniently located handle H for carrying it and for guiding the machine by hand when it travels directly on the surface of the work.

The machine thus is capable of a variety of rectilinear and curvilinear cutting and welding operations on either horizontal, vertical, or inclined work, traveling either on a track as shown in Fig. 1 and Fig. 3, or directly on the surface of the work as shown in Fig. 2. In Fig. 3, the machine is shown operating on the edge of the work with the blowpipe B swung below the carriage by means of a special attachment. In Fig. 2 the machine is shown performing a circular cut guided by a radius rod R. However, the machine is capable of other curvilinear travel on the surface of the work, either hand guided by means of the handle H, or automatically guided by means of a guide bracket E or E' secured to the lug where the radius rod may be attached, as shown in Figs. 14 and 17. In all these operations, the differential F makes possible two-wheel drive. When the machine travels directly on the surface of the work, the rear end is preferably adjustably supported by additional or auxiliary supporting means such as one or more casters or a ball skid P (Fig. 9), which keeps the rear wheels out of contact with the work and permits ready universal motion of the carriage over the work.

The carriage may support a turret or turntable movable about a vertical axis which in turn slidably supports a cross arm having a bracket at at least one end thereof slidably mounted in a vertical guide and provided with a clamp or torch holder for holding a blowpipe B or similar tool. The cross arm may also have slidably and rotatably mounted thereon an auxiliary cross arm having a bracket at the end thereof slidably mounted in a vertical guide and provided with a clamp or torch holder for holding a blowpipe B' or similar tool. Each of these brackets is independently adjustable rectilinearly and rotationally in a horizontal plane and rectilinearly in a vertical plane so that each bracket is capable of independent universal movement.

Also, the auxiliary cross arm may be held stationary relatively to the main cross arm, in which case both brackets move rectilinearly and rotationally in a horizontal plane with the main cross arm. The blowpipe clamps may be swiveled in two mutually perpendicular planes so that the blowtorches may be tilted at any angle in any direction, and the blowpipes may also be slidably adjusted in their clamps, so that they are capable of independent universal movement independently of the independent universal movement of the brackets, which also move the torches. Each torch is therefore independently capable of two independent universal adjustments, which makes the machine extremely flexible and convenient for adjustment to any type of operation on horizontal, vertical, or inclined work.

The carriage or casing C comprises an upper box-like cover 20 telescoping over and interfitting with a lower box-like base 21. The cover 20 is provided with an overhanging apron 22 surrounding and protecting the entire machine, hollow bosses 23 covering the wheels, a hollow boss 24 housing the motor and providing a convenient support for the handle H, and a lug 25 having machined sides 26 thereon and an opening 27 therethrough for attaching a radius rod R (Fig. 13) or a guide bracket E or E' (Figs. 14 and 17). The radius rod is so fitted that it is capable of pivotal movement in a vertical plane only. The handle H comprises a grip 28 cast integral with an annular securing flange 28' which extends around the outer end of the motor-governor assembly, and may conveniently be secured by any suitable means, such as screws 28'', to the end of the hollow boss 24. The grip is thus located directly at the center of the rear end of the machine for convenience in carrying and guiding it. The cover 20 is divided into two compartments by a partition 29 which has a machined edge 30 in the same plane and continues with a similar machined edge 31 on an internal ledge or wall 32. The base 21 is divided into two compartments by a partition 33 having an upper machined edge 34 which abuts the machined edge 30 of the partition 29 in the cover. The machined edge 34 is in the same plane and continuous with a similar machined edge 35 on the side and front walls of the base 21, which abuts the machined edge 31 of the ledge or wall 32 in the cover. The abutting edges may have a gasket 35' between them to insure an oil- and dust-proof fit. The cover 20 and the base 21 may be held in the proper relative alignment by spacing bosses 36 and may be removably secured together by any suitable means, such as screws 37. There is thus provided a dust-proof compartment for housing the gearing in the forward end of the carriage or casing C. In the rear of the casing, however, the walls of the cover and base do not meet, so that this compartment for housing the motor is ventilated so that the motor may be air-cooled. The base 21 may also be provided with a removable bottom plate 38 beneath the dust-proof forward compartment, held in place by screws 39. This plate provides ready access to the gearing and driving axle for lubrication and repairs. The cover 20 also may be removed from the base 21 for gaining ready access to the entire inside of the casing. Within the casing are suitable bosses, brackets, and bearings, for supporting the axles and driving mechanism as will hereinafter more fully appear. Both the cover 20 and the base 21 of the casing C and the handle H are preferably metal castings.

The carriage or casing C may be supported by front driving wheels 40 and 40', secured by any suitable means to the driving axle A, and by rear idler wheels 41 and 41'. The wheels 40 and 41 on one side of the carriage are provided with grooved bearing surfaces for following the track T while the other two wheels 40' and 41' have flat single flanged bearing surfaces to permit of a certain amount of lateral movement over the track tread surface and compensate for lateral inaccuracies. The front wheels 40 and 40' are also provided with raised knurled surfaces for giving added traction when the machine travels on the surface of the work.

One of the rear wheels 41' may be provided with an eccentric shaft 42 to permit the wheel to be adjusted vertically. Due to manufacturing inaccuracies, the bearing surfaces of all four wheels may not be in the same plane, and such a vertical adjustment readily compensates for such inaccuracies. Also, twisting or warping of the track may require some vertical adjustment or resilient movement of one of the wheel mountings to produce a four-point support. Furthermore, when only one blowpipe is used, or when both blowpipes are swung to one side of the machine, the weight is concentrated on the driving wheel nearest the blowpipe with the result that the opposite driving wheel loses traction, and this can be equalized by vertical adjustment of one of the rear wheels. The eccentric shaft 42 may be turned about its axis in the opening through boss 43 of the casing to raise or lower the wheel 41' which bears and turns on the eccentric portion of the shaft. The shaft may be secured in any desired position by any suitable means, such as a set screw 44, screwed into an internally threaded hole through the bottom of the casing.

When the machine travels directly on the surface of the work, the rear wheels 41 and 41' are lifted off the surface of the work and the rear end of the casing is supported by the ball skid P (Figs. 4 and 9). This skid may comprise a rounded hardened steel head 45 and a threaded shank 46 which screws into an internally threaded hole through the bottom of the casing at the center of the rear end thereof. The ball skid may be adjusted vertically by screwing it either in or out to insure that the rear wheels are at all times lifted off the surface of the work, and may be held at any setting by means of a lock nut 47. The friction between the hardened steel head 45 of the skid and the surface of the work is comparatively slight especially since the greater portion of the weight of the machine is concentrated in the forward end. The support thus permits ready universal motion of the machine when it travels directly on the surface of the work.

Power for driving the machine may conveniently be supplied by an electric motor M housed in the ventilated compartment in the rear end of the casing C. The motor may be mounted on bosses 50 by suitable means, such as screws 51, with its armature shaft horizontal to keep the center of gravity of the machine as low as possible and to avoid thrust bearing difficulties, and is preferably adapted to run on a wide range of voltages and on either D. C. or A. C. current conveniently supplied by the line L through the line switch S. A fan 52 mounted on the motor armature shaft 53 provides air cooling for the motor by circulating air through openings 54 in the motor casing. The speed of the motor may be regulated by the adjustable governor G which is preferably of the centrifugal make-and-break type and may be adjusted by a knob 55 which turns the graduated dial D. The dial D may desirably be graduated in inches per minute of travel of the machine and may have two sets of figures, one for high and one for low gear. By setting this dial, using the scale which represents the gear in which the machine is operating, the governor may be adjusted to hold the motor speed constant at a definite value which in turn will cause the machine to travel at the constant speed indicated on the scale. Thus the machine may be caused to operate at any desired predetermined speed from about 2 to about 50 inches per minute. The use of speed change gears as well as an adjustable motor governor for speed regulation makes possible a wide range of speeds without too great a variation in the motor speed. This increases the operating efficiency of the motor.

Power from the motor M is transmitted to the driving axle A through a train of gears housed within the dust-proof compartment in the forward end of the casing C. The motor armature shaft 53 extends through an opening in the partition 33 of the base 21 of the casing C and may be secured to a worm 60 by means of a set screw 61. The worm 60 may be supported in a roller bearing 62 fixed in a bracket or cross brace 63 of the base 21 of the casing C and drives a cooperating worm wheel 64 secured to the upper end of a vertical shaft 65, which is supported at its upper end in a bearing 66 fixed in a bracket 67 cast integral with the side of the base 21 of the casing and at its lower end in a bearing 68 in a bracket 69 secured by suitable means, such as screws 71, to lugs 70 projecting from the inner wall of the base 21 of the casing C. Secured to the lower end of the shaft 65 and turning with it is a gear wheel 72 which drives a cooperating gear wheel 73 secured to the lower end of a worm 74 which is supported at its lower end in a bearing 75 in the bracket 69 and at its upper end in a bearing 76 in the bracket 67. The gear wheel 73 is preferably made of compressed fabric to minimize vibration and noise. Cooperating with the worm 74 is a worm wheel 77 rotatably mounted on a shaft 78 which is rotatably mounted at one end in a bearing 79 in the cross brace 63 and at the other end in a bearing 80 in the end wall of the base 21 of the casing C and at an intermediate point in a bearing 81 in a bracket or cross brace 82 of the base 21 of the casing C. Both the worm wheel 64 and the worm wheel 77 are preferably made of bronze for obtaining the desirable bronze-steel contact between the worm wheels and the respective worms meshing therewith. Secured to and turning with the worm wheel 77 is a gear wheel 83 which cooperates with a gear wheel 84 slidably but not rotatably mounted on a shaft 85 and having a bearing 86 in the cross brace 63. Fixed to the shaft 85 are gear wheels 87 and 88 cooperating with gear wheels 89 and 90 respectively, secured to the shaft 78 for rotating this shaft.

The shaft 85 is slidably mounted within the hub of the gear wheel 84 and slidably and rotatably mounted in a bearing 91 in the cross brace 82 and may be shifted forward or backward by means of the lever L' which is pivoted to the casing at 92 and joined to the shaft through the yoke 93. The lower end of the lever L' may contact a flat spring 94 secured to the partition 33 by screws 95 to hold the lever in either the high gear or low gear position. In the high gear position the gear wheel 87 meshes with and drives the gear wheel 89 as shown, while in the low gear position the shaft 85 is shifted back and the gear wheel 88 meshes with and drives the gear wheel 90.

Power may be transmitted from the shaft 78 to the driving axle A through a conveniently arranged neutral, forward, and reverse mechanism. Two gear wheels 96 and 97 are fixedly mounted on a hollow shaft or hub 98 which is slidably but not rotatably mounted on the shaft 78. As shown in Fig. 4, the mechanism is in the neutral position. By sliding the shaft 98 forward, the gear wheel 97 is caused to mesh with a gear wheel 99 mounted in a bearing in a boss 100 in the end wall of the base of the casing (Fig. 7). A bevel gear 101 fixed to the gear wheel 99 cooperates with a bevel gear 102 which drives the axle A in the forward direction. Similarly, by sliding the shaft 98 back, the gear wheel 96 is caused to mesh with a gear wheel 103 mounted in a bearing in a boss 104 in the cross brace 82. A bevel gear 105 fixed to the gear wheel 103 cooperates with the bevel gear 102 which then drives the axle A in the reverse direction.

The neutral, forward, and reverse mechanism may conveniently be operated by a lever 106 pivoted at 107 on a bracket 108 secured to a boss 109 of the base 21 of the casing. The lever 106 may be coupled with the shaft 98 through a yoke 110 and is actuated by a rod 111 coupled to the lever 106 by a pin 112. The rod 111 in turn is actuated by the lever L″ (Fig. 9) pivoted to the casing at 113 and coupled to the rod 111 by a pin 114. The rod 111 passes through an opening 115 in the partition 33 of the casing which may preferably be sealed dust-proof by a felt packing 116 as shown. It is thus seen that shifting the lever L″ forward will cause the machine to travel forward and shifting this lever backward will cause the machine to travel in reverse. The lever may conveniently be held in the neutral, forward, or reverse position by means of a pressed spring 117 secured beneath the bracket 108 as shown in Figs. 4 and 5. The end of the lever 106 catches in either the center depression of the spring 117 or in the depressions at either side thereof.

Suitable mechanism may be provided for allowing each of the driving wheels 40 and 40′ to move relatively to the other while still transmitting power to both, so that the machine will have two-wheel drive for both rectilinear and curvilinear cutting and welding operations. Such mechanism may conveniently be provided by a differential F of well-known construction. The bevel gear 102 is secured to and turns the differential frame or casing 118 and each of the wheels 40 and 40′ turns with one of the bevel gears 120 and 120′ of the differential. The construction is so well-known that it need not be further described. However, in certain applications of the machine, as in straight line operations, it may be desirable to render the differential inoperative so that both driving wheels turn together as if on a continuous shaft. This may conveniently be accomplished by means of the locking device shown in Figs. 5 and 8. The differential frame or casing 118 is provided with a countersunk recess 119 behind the bevel gear 120 which is secured to a hollow drive shaft 121 for driving the wheel 40. In the recess 119 and around the drive shaft 121 is disposed a split ring 122 which may be spread by means of a conical pin or cam 123 slidably mounted in an opening through the shaft 121. A shaft 124 having the handle or knob K secured thereto and rotatably mounted within the hollow shaft 121 is provided with an eccentric cam 125 contacting the butt end of the pin 123. By turning the shaft 124 by means of the knob K, eccentric cam 125 forces the pin 123 outward, spreading the split ring 122 and frictionally locking the drive shaft 121 and the differential casing 118 together. The differential and both driving wheels then turn as if mounted on a single continuous shaft with no relative motion between them.

Suitable mechanism may be provided on the carriage or casing C for supporting and adjusting at least one blowpipe or similar tool, as shown generally in Fig. 1, and in detail in Figs. 10, 11 and 12. This blowpipe supporting and adjusting mechanism may be mounted on a turret or turntable 130 which is rotatably mounted on the cover 20 of the casing C. The turntable 130 is supported on and within an annular member 131 having a flange 132 at its inner periphery and being secured to the casing C by suitable means, such as screws 133, and is held in place by an annular plate 134 extending under the member 131 and secured to the turntable 130 by suitable means, such as screws 135. The member 131 acts both as a thrust bearing and a guide for the turntable 130. A locking device for the turntable 130 may desirably comprise an eccentric cam 136 operated by means of a shaft 137 and a lever 138. The eccentric cam 136 is housed in a recess in and turns with the turntable and may be caused to bind against the flange 132 of the stationary member 131 by turning the lever 138. The turntable may thus readily be rotated about a vertical axis and locked in any desired position.

The turntable 130 may be provided with a horizontal dovetail slide or groove 139 which slidably supports a cross arm 140. One side of the groove 139 may be formed by a separate member 141 held in place by bolts 142 to permit ready assembling and to make possible adjustment of the width of the groove to compensate for wear. This adjustment may be made by means of bolts 143 which determine the lateral position of the member 141. The cross arm 140 may be caused to slide longitudinally in the groove 139 by means of an externally threaded shaft 144 mounted at both ends in bearings in overhanging portions 145 and 146 of the cross arm. The externally threaded shaft 144 cooperates with an internally threaded opening in a member 147 which is rotatably mounted in an opening in the center of the turntable 130 to avoid any binding through misalignment. The shaft 144 may be rotated by turning a handwheel 149 which is operatively connected to the shaft through a stem 150 mounted in a bearing in the cross arm and bevel gears 151 and 152. It is evident, then, that the cross arm 140 may be readily given angular motion by turning the turntable 130 and rectilinear motion in the direction of its length by turning the handwheel 149.

Mounted at one end of the cross arm 140 by means of a brace 153 and bolts 154 is a member 155 having a vertical dovetail guide or groove 156 therein for slidably supporting a dovetail slide 157 of a torch-supporting bracket denoted generally by 158 (Figs. 11 and 12). The vertical slide 157 may be provided with an internally threaded opening for receiving a threaded shaft 159 mounted in a bearing in the member 155 and having secured thereto a handwheel 160. It is thus seen that by turning the handwheel 160 the bracket 158 may be easily raised or lowered, and the combination of the turntable 130 and the handwheels 149 and 160 then furnishes a simple and convenient means for universally adjusting the bracket 158 and with it the blowpipe B without changing the direction or angle of the blowpipe.

The torch-supporting bracket 158 may preferably comprise two mutually perpendicular swivels so that the blowpipe B may easily be tilted at any angle in any direction. A bracket 161 is rotatably mounted in a bearing in an extension 162 of the slide 157 and may be removably held in place by a bolt 163 and provided with a protractor 164 for indicating the degrees of angular rotation of the bracket. Rotatably mounted in a bearing in the bracket 161 with its axis of rotation perpendicular to the axis of rotation of the bracket is a split torch clamp 165 removably held in place by a bolt 166 and provided with bolts 167 for clamping the blowpipe B in place. A protractor 168 may be provided for indicating the degrees of angular rotation of the clamp 165, and is preferably fixed to the bracket 161 so that it may serve for any clamp which it may be necessary to mount on the bracket according to the size of the blowpipe required for the particular cutting, welding, or flame machining operation to be performed. It is evident, then, that the blowpipe B may be slidably adjusted in the clamp 165 and angularly adjusted in two mutually perpendicular planes, and these adjustments furnish another and independent means for universally adjusting the blowpipe B.

In certain operations it may be desirable to mount another blowpipe on the cross arm 140 which may be independently adjusted. This may conveniently be accomplished by means of an auxiliary cross arm 170 slidably mounted on a flat bar 171 which may in turn be slidably and rotatably mounted on the cross arm 140. The cross arm is provided with a T-shaped groove 172 in which slides and rotates a T-bolt 173 which passes through an opening in the bar 171 and acts as a pivot for this bar. The T-bolt 173 may be slid along the groove 172, thus moving the axis of rotation of the bar 171 as well as the bar itself, which may be secured in any desired position by means of a nut 174. The bar 171 is preferably dovetail in cross section to provide a cooperating slide for a dovetail groove 175 in the auxiliary cross arm 170, which may be caused to slide along the bar 171 by means of an externally threaded shaft 176 which is rotatably mounted in a bearing in a bracket 177 secured to the bar 171 by suitable means, such as screws 178. The externally threaded shaft 176 cooperates with an internally threaded opening in a member 179 mounted in an opening 180 in the auxiliary cross arm 170 by means of a pin 180', and may be turned by turning a handwheel 181, which is operatively connected to the threaded shaft through a stem 182 mounted in a bearing in the bracket 177 and bevel gears 183 and 184. It is thus evident that the auxiliary cross arm 170 may be given angular motion independent of the angular motion of the main cross arm 140 by turning the bar 171 about the T-bolt 173 and rectilinear motion independent of the rectilinear motion of the main cross arm either by moving the T-bolt in its groove 172 which moves the bar 171, or by turning the handwheel 181 which moves the auxiliary cross arm relatively to the bar 171. Of course, the auxiliary cross arm, being mounted on the main cross arm, moves angularly with the main cross arm when the turntable 130 is rotated and rectilinearly with the main cross arm when the handwheel 149 is turned.

Mounted at one end of the auxiliary cross arm 170 by means of a brace 185 and bolts 186 is a vertical member or upright standard 187 having a vertical dovetail guide or groove 188 therein for slidably supporting a dovetail slide 189 of a torch-supporting bracket or arm denoted generally by 190. The member 189 may be provided with an internally threaded opening for receiving a threaded shaft 191 mounted in a bearing in the member 187 and having secured thereto a handwheel 192. The torch-supporting bracket 190 may be precisely similar in construction to the torch-supporting bracket 158 and need not again be described. Thus the upright standard 187, which supports the arm 190, is movable transversely by means of the handwheel 181, and is journaled for pivotal movement with respect to the plate 140 by means of the bolt 173. It is clear then that by turning the handwheel 192 the bracket 190 may be vertically adjusted, and the combination of the pivot about the T-bolt 173 and the handwheels 181 and 192 thus furnishes a simple and convenient means independent of the adjustments for the bracket 158 and the blowpipe B for universally adjusting the bracket 190 and with it the blowpipe B' without changing the direction or angle of the blowpipe. Also, the blowpipe B' may be slidably adjusted in its clamp and angularly adjusted in two mutually perpendicular planes by means of the swivels of the bracket 190, and these adjustments provide a further independent means for universally adjusting the blowpipe B'. Each of the blowpipes B and B' is therefore capable of two separate independent universal adjustments, and may readily be positioned at opposite sides of the machine, or close together at either side of or in front of the machine, or in any position relative to each other at either side of or in front of the machine and in any desired direction and at any desired angle to the work W.

When only one blowpipe is needed, the auxiliary cross arm 170 may be easily dismounted from the main cross arm by removing the bar 171 from the T-bolt 173. The main cross arm 140 may then be provided with a cover plate 140' covering the T-groove 172 and having an opening therethrough for the T-bolt 173, as shown in Fig. 2.

It may be advantageous or desirable in certain instances to have the machine perform operations below the surface of the work W on which the machine is traveling, as for example, the preparation of the edge of a plate for butt welding as shown in Fig. 3. This may conveniently be done by means of the special apparatus shown in Fig. 3. A member 193 is secured by means of a bolt 194 to the slide 157 from which the bracket 161 has been removed by removing the bolt 163. Torch-supporting means may be mounted on the member 193 through two mutually perpendicular swivels. Rotatably and removably mounted by means of a bolt 195 in a bearing in the lower end of the member 193 is a right angle bracket 196 for supporting a torch holder or split clamp 197 which holds the blowpipe B. A protractor 198 may be provided for indicating the degrees of angular rotation of the bracket 196. The clamp 197 may be rotatably and removably mounted by means of a bolt 199 in a bearing in the bracket 196 with its axis of rotation perpendicular to the axis of rotation of the bracket. A protractor 200 may be provided to indicate the degrees of angular rotation of the clamp 197, and is preferably mounted on the bracket 196 so that it will serve for any size clamp that may be necessary to hold a blowpipe suitable for the particular operation required. The blowpipe clamp 197 together with its supporting bracket 196 may be precisely similar in construction to the clamp 165 and its supporting bracket 161 (Figs. 11 and 12), so that it is merely necessary to remove the bracket 161 from the slide 157, mount the member 193 on the slide 157, and then mount the bracket 161 at the lower end of the member 193 to obtain the apparatus shown in Fig. 3. The member 193, and with it the blowpipe B, of course may be adjusted vertically by turning the handwheel 160, horizontally by turning the handwheel 149, and rotationally by turning the turntable 130. Also, the blowpipe B may be slidably adjusted in the clamp 197 and may be rotated in two mutually perpendicular planes. Hence, here again two independent means are provided for universally adjusting the blowpipe B, and it may be readily positioned below the surface of the work W on which the machine is traveling at either side of or in front of the machine and at any angle in any direction.

One or more supports for the hoses supplying oxygen, circulating cooling water, and acetylene or other fuel to the blowpipes B and B' may desirably be provided on the machine. Such a support may conveniently comprise a bracket 201 secured to the bar 171 by means of the T-bolt 173 and nut 174 and having nipples 202 for receiving main supply lines N (shown in skeleton in Fig. 1) and nipples 203 for receiving connecting lines N' leading from the bracket 201 to the blowpipe. In such an arrangement, the main lines may remain connected to the bracket and it is then necessary only to change the connecting lines when another blowpipe is used. Of course, the lines N and N' may be continuous, in which case the bracket 201 would be provided with hose clamps instead of the nipples 202 and 203. The bracket 201 as shown is provided with nipples for oxygen and acetylene supply lines to each of the two blowpipes B and B'. Since the bracket 201 is mounted on and moves with the main cross arm, the relative movement between the bracket and the blowpipes B and B' is minimized, which minimizes the length and wear of the connecting lines N'.

It should be noted that, as is evident from the foregoing description, all of the motor and drive mechanism is mounted on and within the base 21 of the casing C and all of the torch-supporting and adjusting mechanism is mounted on the cover 20 of the casing C, so that the machine comprises two independent and readily separable units. The only connections between the cover 20 and the base 21 besides the screws 37 which hold the cover and base together are the switch S controlling the motor circuit and the shift levers L' and L'', all of which may be easily disconnected.

When the machine travels directly on the surface of the work to perform circular cutting, welding, or flame-machining operations, it may be guided by means of the guide or radius rod R as shown in Figs. 2 and 11. Referring to Fig. 11, the radius rod R may be adjustably held by a center comprising a pointed support 205 and a weight 206 mounted on the support 205. The radius rod slides in an opening through the weight 206 and may be adjusted to any desired length from the center and clamped by a thumb screw 207. The weight 206 is preferably slidably mounted on the support 205 and may be held at any desired elevation by a thumb screw 208. Thus, the radius rod R may be readily adjusted to the proper length and height. Of course, the support 205 and weight 206 may be made integral, in which case there would be no vertical adjustment.

The radius rod R may be attached to the lug 25 of the casing C preferably by the yoke shown in Fig. 13. The yoke comprises a fork 209 whose prongs straddle the lug 25 and are spaced from the machined edges 26 thereof. One prong of the fork 209 is provided with a pin 210 secured in an opening through the prong and having a head 211 provided with a tapered edge adapted to engage a beveled edge of the opening 27 through the lug 25. In the other prong opposite the pin 210 and axially in line with it is an internally threaded opening into which is screwed a bolt 212 provided with a knurled head 213 for finger operation and a lock nut 214. The end of the bolt 212 is provided with a tapered edge adapted to engage a beveled edge of the opening 27 through the lug 25. In attaching the radius rod, the bolt 212 is backed off until the fork 209 passes over the lug 25. The fork is then so positioned that the tapered edge of the head 211 of pin 210 engages one beveled edge of the opening 25, after which the bolt 212 is screwed in until the tapered edge of its end engages the other beveled edge of the opening 25 and locked with the lock nut 214. This construction provides a yoke which makes the radius rod R free floating in a vertical plane to compensate for unevenness in the surface of the work but nevertheless rigid in a horizontal plane so that the rod is kept perpendicular to the line of travel of the machine.

When the machine travels directly on the surface of the work, it may be desirable in certain instances to provide means associated with the machine for automatically guiding it along any predetermined rectilinear or curvilinear path. Such means may comprise a special guide bracket E which follows along a single track or template T' as shown in Figs. 14, 15, and 16, or a special guide bracket E' which follows along a single track or template T'' as shown in Figs. 17, 18, and 19. Referring to Figs. 14, 15, and 16, the bracket E may comprise two curved vertical members 215 and 216 adapted to fit on each side of the lug 25 on the upper member 21 of the casing C and a flat horizontal member 217 rigidly secured to the vertical members 215 and 216 by suitable means such as welding. The bracket E may be rigidly but removably secured to the casing C of the machine by a bolt 218 and a cooperating nut 219 and by clamps 220 and 221. The bolt 218 passes through openings in the members 215 and 216 and through the opening 27 in the lug 25 and with its cooperating nut 219 securely clamps the members to the lug. The clamps 220 and 221 may be rigidly secured to the member 217 and may be adapted to hook under the hollow boss 23 of the upper member 21 of the casing C. Bolts 222 and 223 screwing through internally threaded openings in the member 217 and bearing against the hollow boss 23 may be provided for securely clamping the clamps 220 and 221 to the boss. There is thus provided a rigid three-point support for the bracket E on the casing C of the machine.

The guide bracket E may be provided with two swiveled roller followers mounted at either end of the member 217 in the manner shown in Fig. 16. A member 224 is fixed to a shaft 225 which is rotatably mounted in a bearing in the member 217. Mounted in openings at either end of the member 224 are shafts 226 and 227 on which rollers or wheels 228 and 229 are rotatably mounted. The wheels 228 and 229 are so positioned that one follows one side and the other the other side of the template T'. In order to adjust the spacing of these wheels to varying widths of templates, the shaft 226 may be held in a split clamp and may be provided with an eccentric portion on which the wheel 228 is mounted. One end of the member 224 may be split to provide the split clamp tightened by a bolt 230. By loosening the bolt 230 and turning the shaft 226, the wheel 228 may be adjusted to the width of the template T'. The roller followers are swiveled to minimize binding and to facilitate directing the guide bracket around or along the curves of the template.

The guide bracket E' shown in Figs. 17, 18, and 19 following along the template T'' is another embodiment of means for automatically guiding the machine along any predetermined rectilinear or curvilinear path when it travels directly on the surface of the work W in accordance with this invention. This bracket is vertically adjustable to various heights of templates as well as laterally adjustable to various widths of templates. The bracket comprises a vertical member 231 removably secured to the casing C of the machine and a horizontal member 232 mounted on the member 231 and vertically slidable thereon. The member 231 is provided with a slotted projection 233 snugly fitting over the machined edges 26 of the lug 25 and having an opening therethrough coaxial with the opening through the lug for receiving a securing bolt 234 and nut 235. A clamp 236 secured to the lower end of the member 231 and adapted to hook under the hollow boss 23 of the cover 20 of the casing is held tightly against the hollow boss by the pressure of flat springs 237 and 238 secured to the member 231 by any suitable means, such as screws 239. In mounting the bracket on the casing, the clamp 236 is first hooked under the hollow boss 23 and the member 231 is then pushed into place over the lug 25 against the pressure of springs 237 and 238 until the openings through the lug and projection 233 coincide, after which the bolt 234 is inserted and secured with the nut 235. The member 231 may be provided with vertical guides 240 and 241 and a slot 242 for receiving a T-bolt 243 having a securing nut 244. The member 232 may be provided with grooves slidably cooperating with the guides 240 and 241 and an opening through which the shank of the T-bolt 243 passes. It is thus evident that the member 232 may be raised or lowered relatively to the member 231 by sliding the T-bolt 243 in the groove 242 and may be secured in any desired position by tightening the nut 244. This provides a simple means for quickly adjusting the bracket E' vertically to various heights of templates.

The horizontal member 232 of the bracket E' is provided at both ends with outwardly extending projections 245 and 246 in which are mounted swiveled roller followers having adjustably spaced rollers. This construction may be precisely similar to that shown in Fig. 16 and need not again be described.

The guide brackets shown make possible maintaining the machine at all times substantially perpendicular to the curve of the template. For curves of slight curvature, the blowpipe will very closely reproduce the curve of the template, and for curves of great curvature, although the blowpipe does not accurately reproduce the curve of the template, the guide bracket is also of utility since it is merely necessary to make a template which will produce the desired curve, and the template may then be used to guide the machine for any number of repeated operations.

It will, of course, be appreciated that certain changes and substitutions may be made in the arrangement of parts and construction of the novel machine herein described without departing from the principles or scope of this invention as set forth in the appended claims.

What is claimed is:

1. In a machine for supporting a cutting or welding blowpipe or similar tool, a box-like casing supported by wheels and comprising a base and a cover telescoping over and interfitting with said base, a partition in said base having an edge in the same plane and continuous with a peripheral edge of said base, a partition in said cover having an edge abutting the edge of the partition in said base, a ledge or wall around a portion of the inside of said cover having an edge in the same plane and continuous with the edge of the partition in said cover and abutting the peripheral edge of said base, and means for securing said cover to said base to form a dust-proof compartment.

2. In a machine for supporting a cutting or welding blowpipe or similar tool, a box-like casing supported by wheels and comprising a base having upwardly extending side walls and a partition extending between said side walls to form a plurality of compartments, at least one of the compartments being sufficiently fluid-tight as to contain liquid lubricant, and at least one of the compartments being provided with a vent for the admission of air; a cover having downwardly depending side walls adapted to telescope over the side walls of said base so as to enclose said base, said cover forming when in the assembled position a fluid-tight seal with the walls of the fluid-tight compartment; a motor in the vented compartment; and transmission means in the fluid-tight compartment and operative to transmit power from said motor to at least one of the wheels.

3. In a machine for supporting a cutting or welding blowpipe or similar tool and capable of traveling on a track or on the surface of the work, a carriage having front and rear wheels normally in contact with the track or work surface, means within said carriage for driving at least one of said front wheels, means for vertically adjusting at least one of said wheels, and a skid positioned near the rear portion of said carriage for lifting said rear wheels out of operative relation and for slidably supporting the rear portion of said carriage when said machine travels on the surface of the work.

4. In a machine for supporting a cutting or welding blowpipe or similar tool and capable of traveling on a track or on the surface of the work, a carriage having front wheels adapted to run on a track or on the surface of the work and rear wheels adapted to run on a track; means in said casing for driving at least one of said front wheels; and means, including a differential associated with said driving means and a skid for rendering said rear wheels inoperative, for facilitating universal motion of said machine when it travels on the surface of the work.

5. In a machine for supporting a cutting or welding blowpipe or similar tool and capable of traveling on a track or on the surface of the work, a carriage having front wheels adapted to run on a track or on the surface of the work and rear wheels adapted to run on a track, means in said carriage for driving at least one of said front wheels, and means including a skid for rendering said rear wheels inoperative and for slidably supporting the rear end of said carriage when said machine travels on the surface of the work.

6. A cutting and welding machine comprising a carriage supported by wheels; means on said carriage for supporting at least one cutting or welding blowpipe or similar tool; a motor in said carriage; means including speed change gears and a combination neutral, forward, and reverse mechanism associated with said speed change gears for transmitting power from said motor to at least one of said wheels; and adjustable centrifugal governing means associated with said motor for maintaining the speed of said carriage at a predetermined rate.

7. A cutting and welding machine comprising a carriage supported by wheels, means on said carriage for supporting at least one cutting or welding blowpipe or similar tool, a motor in said carriage, means for transmitting power from said motor to at least one of said wheels, and means including an adjustable centrifugal speed governing device on said motor and speed change gears forming part of said power-transmitting means for causing said machine to travel at any predetermined speed.

8. A cutting and welding machine comprising a carriage supported by wheels, means on said carriage for supporting at least one cutting or welding blowpipe or similar tool, a motor in said carriage, means for cooling said motor, means for transmitting power from said motor to at least one of said wheels, and means including an adjustable centrifugal speed governing device on said motor and speed change gears forming part of said power-transmitting means for causing said machine to travel at any predetermined speed.

9. A cutting and welding machine comprising a carriage supported by wheels, means on said carriage for supporting at least one cutting or welding blowpipe or similar tool, axle means in said carriage connected to and driving two of said wheels, a motor in said carriage, means in said carriage for transmitting power from said motor to said axle, mechanism associated with said power transmitting means for allowing one of said driven wheels to move relatively to the other while delivering power to both, and means including a member extending through said axle for inhibiting such relative movement.

10. A cutting and welding machine comprising a carriage supported by wheels, means on said carriage for supporting at least one cutting or welding blowpipe or similar tool, a motor in said carriage, an axle in said carriage connected to and driving two of said wheels, gear means in said carriage for transmitting power from said motor to said axle, a differential associated with and forming part of said axle, and means including a member extending through said axle and projecting from the end of said axle for locking said differential.

11. In a cutting and welding machine, a carriage, a cross arm rotatably mounted on said carriage, said arm being immovable vertically, mechanism on said cross arm for moving it in the direction of its length, and means including a member mounted on said cross arm vertically movable thereon for supporting at least one cutting or welding blowpipe or similar tool, said blowpipe being universally adjustable on said member.

12. In a cutting and welding machine, a carriage, a cross arm mounted on said carriage, said arm being vertically immovable, at least one bracket mounted on said cross arm, means forming part of said bracket for supporting a blowpipe, means for universally adjusting said bracket, and means independent of said bracket-adjusting means for universally adjusting said blowpipe.

13. In a cutting and welding machine, a carriage, a cross arm rotatably mounted on said carriage, said arm being slidable along its length and vertically immovable, means for mounting at least two brackets on said cross arm, means forming part of said brackets for supporting blowpipes, means for independently universally adjusting each of said brackets, and means independent of said bracket-adjusting means for independently universally adjusting each of said blowpipes.

14. In a cutting and welding machine, a carriage, a cross arm slidably and rotatably mounted on said carriage, said cross arm being vertically immovable, means for slidably mounting at least one bracket on said cross arm, means for vertically adjusting said bracket, means forming part of said bracket for supporting a blowpipe, and means for rotating said blowpipe in two mutually perpendicular planes.

15. In a cutting and welding machine, a carriage, a turntable adjustable about a vertical axis mounted on said carriage, a cross arm mounted on said turntable and immovable in a vertical plane, means on said cross arm for mounting at least one blowpipe, and means for universally adjusting said blowpipe.

16. In a cutting and welding machine, a carriage supported by wheels, a turntable adjustable about a vertical axis mounted on said carriage, means for locking said turntable in any position, a cross arm slidably mounted on said turntable and vertically immovable thereon, means for adjusting said cross arm in the direction of its length, means on said cross arm for mounting at least one blowpipe, and means for universally adjusting said blowpipe.

17. In a cutting and welding machine, a carriage supported by wheels, a turntable rotatable in a horizontal plane mounted on said carriage and having a groove, a cross arm slidably mounted in the groove and immovable in a vertical plane, means for adjusting the width of said groove, means on said cross arm for mounting at least one blowpipe, and means for universally adjusting said blowpipe.

18. In a cutting and welding machine, a carriage, means on said carriage for mounting a cross arm, means for adjusting said cross arm in the direction of its length and about a vertical axis, means on said cross arm for supporting a blowpipe, means on said cross arm for mounting an auxiliary cross arm, means for adjusting said auxiliary cross arm in the direction of its length and about a vertical axis independently of said main cross arm, and means on said auxiliary cross arm for supporting a blowpipe.

19. In a cutting and welding machine, a carriage supported by wheels, a turntable adjustable about a vertical axis mounted on said carriage, a cross arm slidably mounted on said turntable, means for adjusting said cross arm in the direction of its length, means on said cross arm for supporting a blowpipe, an auxiliary cross arm, means on said cross arm for mounting said auxiliary cross arm, means for adjusting said auxiliary cross arm in the direction of its length and about a vertical axis independently of said main cross arm, means for changing the position of said last-mentioned vertical axis, means on said auxiliary cross arm for mounting a blowpipe, and means for rotating each of said blowpipes in two mutually perpendicular planes.

20. In a cutting and welding machine capable of traveling on a track or on the surface of the work, a carriage supported by wheels, a cross arm rotatably mounted on said carriage, means associated with said cross arm for so mounting at least one blowpipe thereon as to suspend said blowpipe below the surface of the work on which said machine is traveling, and means for universally adjusting said blowpipe.

21. In a machine for supporting a cutting or welding blowpipe, the combination of a carriage supported by wheels, a cross arm mounted on said carriage, an auxiliary cross arm pivotally secured to said cross arm, and means at the end of said auxiliary cross arm for supporting a blowpipe.

22. In a cutting and welding machine capable of traveling on a track or on the surface of the work, a carriage supported by wheels, a substantially horizontal turntable rotatably mounted on said carriage, a cross arm slidably mounted on said turntable, means for adjusting said cross arm in the direction of its length, means on said cross arm for slidably mounting a bracket, means for vertically adjusting said bracket, means associated with said bracket for so mounting a blowpipe thereon as to suspend said blowpipe below the surface of the work on which said machine is traveling, and means for rotating said blowpipe in two mutually perpendicular planes.

23. In a machine for supporting a cutting or welding blowpipe or similar tool, the combination of a carriage, a cross arm slidably and rotatably mounted on said carriage, means for mounting at least one blowpipe on said cross arm, lines for supplying gas to said blowpipe, and means mounted on said cross arm for supporting said gas supply lines.

24. In a machine for supporting a cutting or welding blowpipe or similar tool, the combination of a carriage, a cross arm slidably and rotatably mounted on said carriage, means for mounting at least two blowpipes on said cross arm, means for independently universally adjusting said blowpipes, lines for supplying gas to said blowpipes, and a bracket mounted on said cross arm for supporting said gas supply lines.

25. In a machine for supporting a cutting or welding torch or similar tool and capable of traveling on a track or on the surface of the work, the combination of a carriage supported by wheels, means in said carriage for driving at least one of said wheels, a guide rod, and means for so connecting said guide rod to said carriage as to permit relative angular motion in a vertical plane but in no other plane between said rod and said carriage.

26. In a machine for supporting a cutting or welding torch or similar tool and capable of traveling on the surface of the work, the combination of a box-like casing supported by wheels comprising a base and a cover interfitting with and telescoping over said base to form an overhanging apron around said base, means in said casing for driving at least one of said wheels, guide means adapted to follow along a single track or template, and means including a lug on said casing and a clamp around said apron for rigidly but removably securing said guide means to said casing.

27. In portable apparatus for cutting or welding metals, the combination of a casing comprising a box-like base and a cover therefor; tool-holding means carried by said casing; a pair of front wheels and a pair of rear wheels, all rotatably connected to said base to support said casing; a drive motor mounted within the rear end of said base; means outside the rear end of the base for varying the speed of said motor; mechanism inside said base for transmitting power from said motor to one or both of said front wheels to propel said casing, said mechanism comprising: a differential associated with both front wheels, speed reducing gearing, and neutral, forward, and reversing mechanism; means operable from the exterior of said casing to lock said differential so as to cause both front wheels to rotate in unison at the same speed; and means operable from the exterior of said casing for controlling said speed reducing gearing, and said neutral, forward, and reversing mechanism.

28. In a machine for supporting a cutting or welding blowpipe or similar tool, a box-like casing comprising a base having upwardly projecting side walls and a cover telescoping over the walls of said base; wheels rotatably mounted directly on said base; and means for detachably securing said cover to said base.

29. In a machine for supporting a cutting or welding blowpipe or similar tool, a carriage comprising a box-like base and a box-like cover telescoping over and interfitting with the top edge of said base to form a substantially fluid-tight casing, wheels rotatably mounted directly on said base, means in said box-like base for driving at least one of said wheels, and means for removably securing said cover to said base.

30. In a machine for supporting a cutting or welding blowpipe or similar tool, a box-like casing supported by wheels and comprising a box-like substantially fluid-tight base and a cover telescoping over and interfitting with said base, power-supplying means in said casing, transmission means in said substantially fluid-tight base for transmitting power from said power-supplying means to at least one of said wheels, said casing having formed therein when said cover is in position a ventilated compartment for housing said power-supplying means and a substantially fluid-tight compartment for housing said power-transmitting means and for containing a liquid lubricant, and means for removably securing said cover to said base.

31. In a cutting and welding machine, a box-like carriage comprising a base and a cover, said cover being adapted to be removably secured to said base and to cooperate therewith to form a substantially enclosed casing having a ventilated compartment and a virtually fluid-tight compartment for containing lubricant formed therein, a motor mounted on said base and housed within said ventilated compartment, wheels rotatably mounted directly on said base mechanism mounted on said base and housed within said lubricant-containing compartment for transmitting power from said motor to at least one of said wheels, and mechanism mounted on said cover for supporting and adjusting at least one blowpipe or similar tool.

32. In a cutting or welding machine, a carriage supported by at least four wheels, a cutting or welding blowpipe or similar tool mounted on said carriage, and means including a pivotally mounted eccentric shaft for vertically adjusting one of said wheels with respect to the remaining three wheels to insure the distribution of the weight of the machine on all four of said supporting wheels.

33. In a machine for supporting a cutting or welding blowpipe or similar tool and capable of traveling on the surface of the work, a carriage having front and rear wheels, means in said carriage for driving at least one of said front wheels, and additional supporting means for supporting said carriage with said rear wheels out of operative engagement with the surface of the work, said additional supporting means being free for movement universally over the surface of the work.

34. In a machine for supporting a cutting or welding blowpipe or similar tool and capable of traveling on the surface of the work, a carriage having two front wheels adapted to run on the surface of the work and two rear wheels adapted to run on the surface of the work, means in said carriage for driving at least one of said front wheels, and adjustable supporting means adapted to be mounted on said machine for raising said two rear wheels out of operative engagement with the surface of the work, said supporting means being free to move over the surface of the work and being coactive with said two front wheels to provide three-point support for said machine.

35. A cutting and welding machine comprising a carriage supported by wheels; means on said carriage for supporting at least one cutting or welding blowpipe or similar tool; said carriage comprising a casing including a box-like base and a detachable cover adapted, when assembled, to form several compartments, one of which is sufficiently fluid-tight to contain oil; a motor disposed in one of the compartments; means including speed change gears and a combination neutral, forward and reverse mechanism disposed in the substantially fluid-tight and oil-containing compartment and operatively supported by the walls of said base for transmitting power from said motor to at least one of said wheels; means including a lever external of said casing for shifting said speed change gears and holding them in their shifted position; and means including a lever external of said casing for shifting said combination neutral, forward, and reverse mechanism and holding it in the neutral, forward, or reverse position.

36. In a machine for supporting a cutting or welding torch or similar tool and capable of traveling on the surface of the work, the combination of a carriage supported by wheels, means in said carriage for driving at least one of said wheels, a guide member adapted to be supported on the surface of the work, a guide bracket secured to said carriage and extending laterally therefrom, a member pivotally mounted on said bracket to swing about a substantially vertical axis, and rollers rotatably mounted on said member adapted to cooperate with said guide member for causing the machine to follow a rectilinear or curvilinear path dependent upon the shape of said guide member.

JAMES H. BUCKNAM.
ALFRED J. MILLER.